(12) United States Patent
Guigan et al.

(10) Patent No.: US 6,353,500 B1
(45) Date of Patent: Mar. 5, 2002

(54) STATIC SCREEN FOR ANIMATED IMAGES

(76) Inventors: Franck Guigan, Chateau de la Motte, 77940 Thoury Ferrottes; Isabelle Chaumet, 106 Boulevard du Montparnasse, 75014 Paris, both of (FR)

( * ) Notice: Subject to any disclaimer, the term of this patent is extended or adjusted under 35 U.S.C. 154(b) by 13 days.

(21) Appl. No.: 09/618,439

(22) Filed: Jul. 18, 2000

Related U.S. Application Data

(63) Continuation of application No. 09/101,223, filed on Sep. 3, 1998, now abandoned.

(30) Foreign Application Priority Data

Nov. 7, 1996 (FR) ............................................. 96 13577
Nov. 5, 1997 (FR) ................. PCT/FR/97/01976

(51) Int. Cl.$^7$ ........................ G03B 21/60; G03B 25/02; G02B 27/22; G02B 27/10
(52) U.S. Cl. ...................... 359/456; 359/619; 359/463; 40/454
(58) Field of Search ................................ 359/443, 454, 359/455, 456, 458, 463, 472, 619, 620, 626, 623, 624, 628; 40/454

(56) References Cited

U.S. PATENT DOCUMENTS

| | | | | |
|---|---|---|---|---|
| 2,833,176 A | | 5/1958 | Ossoniak ....................... 88/16 |
| 3,568,346 A | * | 3/1971 | Smith ........................... 40/125 |
| 4,944,572 A | * | 7/1990 | Young .......................... 350/167 |
| 5,208,620 A | * | 5/1993 | Mitsutake et al. ............. 353/74 |
| 5,237,449 A | * | 8/1993 | Nelson et al. ................ 359/532 |
| 5,485,308 A | * | 1/1996 | Hirata et al. ................. 359/457 |
| 5,579,164 A | * | 11/1996 | Chapnik ...................... 359/618 |
| 5,592,332 A | * | 1/1997 | Nishio et al. ................ 359/619 |
| 5,678,089 A | * | 10/1997 | Bacs, Jr. et al. ............. 396/324 |
| 5,739,930 A | * | 4/1998 | Sato et al. ..................... 359/23 |
| 5,991,073 A | * | 11/1999 | Woodgate et al. .......... 359/463 |
| 6,128,132 A | * | 10/2000 | Wieland et al. ............. 359/463 |

FOREIGN PATENT DOCUMENTS

| | | |
|---|---|---|
| FR | 2599519 | 12/1987 |
| GB | 2234363 | 1/1991 |

* cited by examiner

Primary Examiner—Christopher E. Mahoney
(74) Attorney, Agent, or Firm—Ostrolenk, Faber, Gerb & Soffen, LLP

(57) ABSTRACT

The screen proposed makes it possible, without spectacles, to view thousands of successive still or animated images, in three dimensions, using a screen that has no moving parts, is of simple design, and economic to manufacture. Applications of the present invention relate mainly to fixed displays for viewing by spectators who move relative to the screen, displays on moving surfaces for viewing by stationary spectators, electronic image displays, creating games and toys, etc.

17 Claims, 5 Drawing Sheets

2a 2b 2c 2d 2e 1a 1b 1c 1d 1e 2a 2b 2c 2d 2e 1a 1b 1c 1d 1e 2a 2b 2c 2d 2e 1a 1b 1c 1d 1e

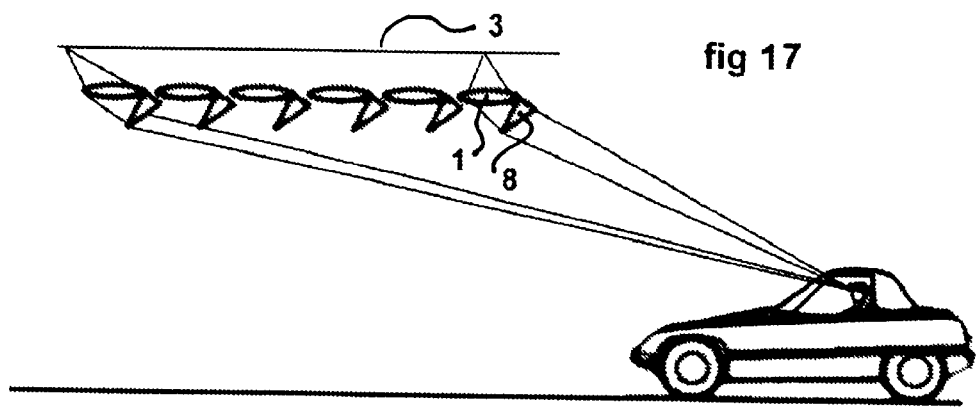
fig 17
fig 18
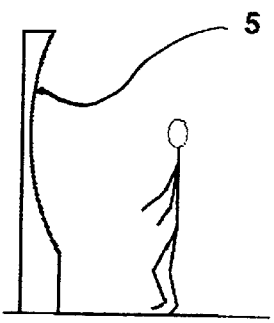
fig 20
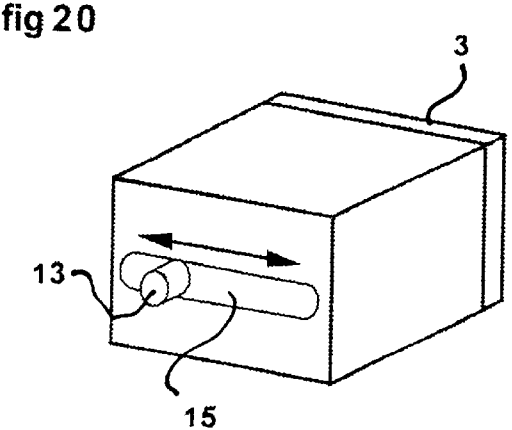
fig 19
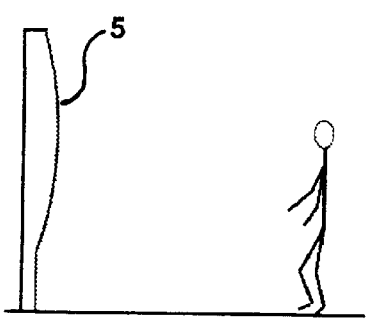

STATIC SCREEN FOR ANIMATED IMAGES

This is a continuation of application Ser. No. 09/101,223, filed Sep. 3, 1998 now abandoned.

The present invention relates to a static screen for animated images.

Static devices are known that provide a view that is in relief or that is animated, and that are constituted by a set of lenses or prisms constituting a lens array associated with a "primary" image itself made up of points known as "pixels", said lens array enabling the eye of a spectator to see different subsets of said pixels depending on the postion of the eye relative to the device.

Each subset of pixels constitutes a different image which can be seen by the eye of the spectator from one or more different locations.

In the dispositions used for those known devices, the lenses or prisms are generally arranged in columns and the pixels that are to be seen through a column of lenses or prisms are situated in register with the column or lenses or prisms, and a set of pixels that is to be seen through a lens or prism is of a width that is smaller than or equal to the width of the lens or prism in question.

The resolution of the image seen by the spectator, which can be expressed in pixels per inch (and often written "dots per inch" or DPI) increases with decreasing width of each lens, and as a result the width of a set of pixels seen through a lens is limited. This narrow width limits the number of different images that can be seen by the spectator of such a known device.

Embodiments of the proposed screen make the following possible:

animated images can be viewed because it is possible to have a large number of successive images present;

images can be viewed in relief;

images can be viewed which are both animated and in relief, using a screen that has no moving parts, that is of simple design, and economical to manufacture.

The proposed device is a screen comprising a plurality of juxtaposed optical devices referred to as "elementary devices", each of said elementary devices comprising:

an elementary lens 1 or equivalent optical system referred to as an "elementary lens"; and an elementary image 2 situated in register with said elementary lens, constituted by a set of points 2a, 2b, 2c, et seq. referred to as "pixels" that the spectator can see through said elementary lens 1, the spectator seeing one or more different pixel(s) depending on the position of the spectator relative to the elementary lens 1, the screen being characterized by the facts that:

the shape of said elementary image 2 is not identical to the projection of said elementary lens 1 onto the surface of the screen, but on the contrary is of mean height smaller than the projection of said elementary lens 1 onto the screen and of mean width greater than the projection of said elementary lens 1 onto the screen, thus having the effect that a portion of the elementary image is situated in register with a portion of an elementary lens that is adjacent to the elementary lens 1 under consideration; and two adjacent elementary images are offset in height relative to each other so as to avoid overlapping; it being specified that the terms "height" and "width" as used above and below relate to measurements made along respective ones of two arbitrary perpendicular axes referred to as the "vertical" axis and as the "horizontal" axis, both situated in the plane of the screen, neither of these axes necessarily being vertical or horizontal relative to the earth.

According to other characteristics of the invention:

said elementary image is inscribed in a rectangle of height (h) and width (l) defined by the following formulae:

$$h=(S/w)^{0.5} \times [D/(D-F)]/K$$

$$l=(S/w)^{0.5} \times [D/(D-F)] \times K$$

S being the total surface area of the set of elementary lenses as projected onto the plane of the screen;

w being the total number of elementary lenses;

D being the distance between the eyes of the spectator and the plane containing the elementary images, F being the distance between the focal plane of the elementary lenses and the plane containing the elementary images; and K being an arbitrarily chosen coefficient greater than 1;

two adjacent elementary images are offset in height by the height of one elementary image;

the "horizontal" axis is parallel to the displacement axis of the spectator in a plane parallel to the plane of the screen, and the ratio K is equal to the square root of the ratio that exists between the width and the height of the rectangle constituted by orthogonally projecting onto the screen the geometrical locus of possible locations for the eyes of the spectator, said locus being referred to as the spectator's viewing range;

the elementary lenses are lenses in the form of regular hexagons, each lens touching another lens on all six sides, the rows of lenses being inclined at an angle of 0.33 radians relative to the displacement axis of the spectator in a plane parallel to the plane of the screen, and said coefficient K being equal to 2.77;

each elementary lens is constituted by a centered lenticular system 5 and a prism 6;

the elementary lenses 1 are not offset vertically relative to one another, and the prism angle deflects light rays in such a manner that corresponding points of two elementary images 2a and 2b are seen by the spectator through the two corresponding elementary lenses 1a and 1b;

the horizontally juxtaposed elementary lenses 1a and 1b are not offset vertically to each other, and the optical axes of said elementary lenses 1 are offset vertically in such a manner that corresponding points of two elementary images 2a and 2b are seen by the spectator through the two corresponding elementary lenses 1a and 1b;

the elementary lens 1 is provided with a prism system 8 deflecting light rays towards spectators not situated in register with said elementary lens.

each elementary image 2 comprises, from one side edge to the other, and in order:

a) a set C(x,y)P(n) of points copied from a subset, of abscissa x and of ordinate y, of the primary image of rank n;

b) a set C(x,y)P(n+1) of points copied from a subset, of abscissa x and of ordinate y, of the primary image of rank n+1; and c) so on, the abscissa x and the ordinate y of the elementary image being respectively equal to the abscissa x and the ordinate of the sets C, it being specified that the term "primary images" is used above and below to designate the images that are to be shown in succession to a spectator moving along the screen, and that the term "rank" is used above and below with respect to a primary image to designate the chronological order in which said primary is to be seen by the spectator moving along the screen;

each elementary image 2 comprises, from one side edge to the other, and in order:
a) a set C(x,y)P(n) of points copied from a subset, of abscissa x and of ordinate y, of the primary image of rank n;
b) a set C(x−1,y)P(n+1) of points copied from a subset of abscissa x−1 and of ordinate y of the primary image of rank n+1; and
c) so on, the ordinate y of the elementary image being equal to the ordinate of the sets C;

the "primary" images serving to make the elementary images 2 are created by a motion picture camera which, while recording said primary images, describes a trajectory whose axis is substantially different from an axis parallel to the axis of the camera lens;

the camera is stationary and the subject to be filmed is situated on a turntable;

the elementary lenses 1 are Fresnel lenses;

the faces of the elementary lenses 1 situated on the same side as the spectator are plane and together they constitute the face of the screen situated on the same side as the spectator;

the elementary lenses 1 are obtained by molding plates of transparent material, each comprising a large number of elementary lenses;

each elementary lens comprises a lens 5 having a plane face situated on its side remote from the spectator, said face being situated in a plane referred to as the "unique" plane which is identical for all of the elementary lenses, and a transparent plate 12 having different optical characteristics is stuck to the lenses 5, adhesion taking place in the said unique plane, and the elementary images being applied directly to the rear face 3 of said transparent plate 12; and the screen includes an image acquisition device, e.g. a set of photoelectric sensors or a photographic film, replacing the set of elementary images 3, and is situated on the rear face of a camera, comprising:
a) a conventional photographic lens 13 mounted on a horizontal slideway 15; and
b) a shutter enabling the lens to make multiple successive exposures.

The invention will be well understood and other objects, advantages, and characteristics thereof will appear more clearly on reading the following description which is illustrated in FIGS. 1 to 20.

FIG. 1 is a perspective view of an elementary part of a device of the invention made up of an elementary lens 1 and an elementary image 2 seen by a spectator whose eyes move in a viewing range 4 along a "horizontal" axis 9;

FIG. 2 is a perspective view of two juxtaposed elementary lenses 1a and 1b and two elementary images 2a and 2b associated with these two lenses, in a first embodiment;

FIG. 3 is a perspective view of an elementary lens 1 associated with a prism 6 and the corresponding elementary image 2, in a second embodiment;

FIG. 4 is a perspective view of a set of two elementary lenses 1a and 1b that are juxtaposed horizontally in said second embodiment, associated with two corresponding elementary images 2a and 2b;

Figure 11:
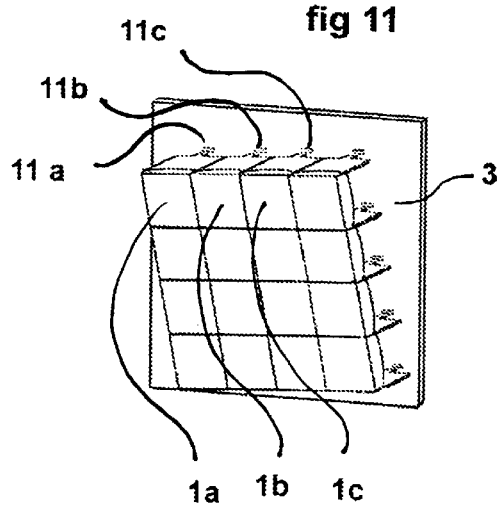
Figure 12:
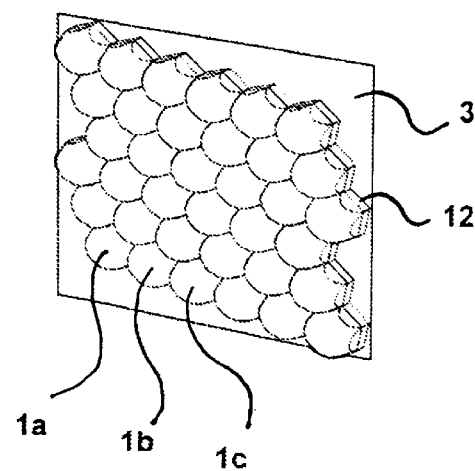
Figure 13:
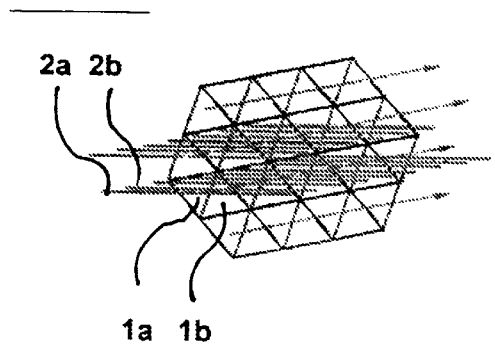
Figure 14:
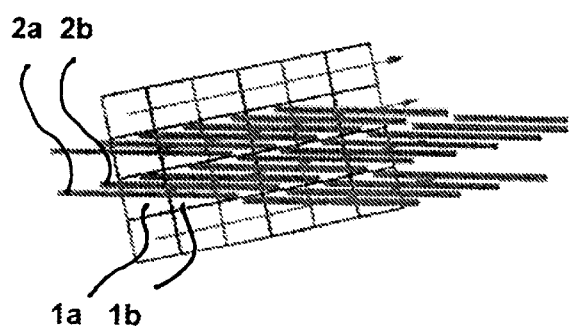
Figure 15:
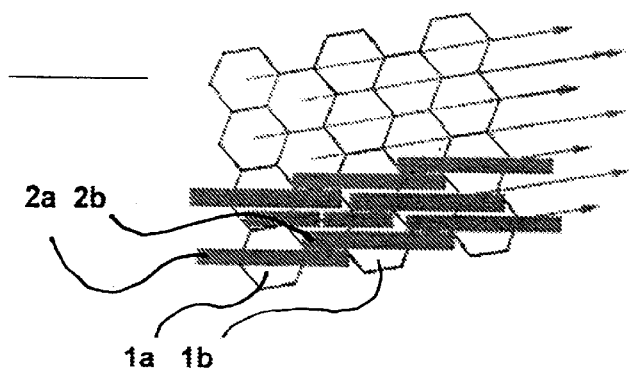
Figure 16:
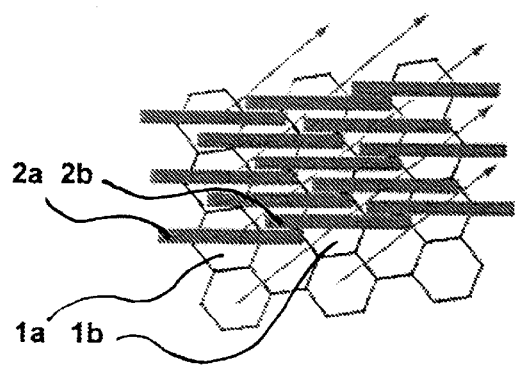

FIG. 11 is a perspective view of a set of elementary lenses 1a, 1b, 1c, et seq., whose face on the spectator side is plane, the lenses being associated with a set of elementary images printed on a plane medium 3, and being fixed to said medium by studs 11a, 11b, 11c, et seq.;

FIG. 12 is a perspective view of a set of hexagonal elementary lenses 1a, 1b, 1c, et seq., whose face situated away from the spectator is plane and is stuck onto a plate 12 whose rear face situated in the plane 3 directly receives the printing of the elementary images;

FIG. 13 is a plan view of a set of triangular elementary lenses 1a, 1b, et seq. and of the elementary images 2a, 2b, et sea. associated therewith;

FIG. 14 is a plan view of a set of rectangular elementary lenses 1a, 1b, et seq. and of the elementary images 2a, 2b, et seq. associated therewith;

FIG. 15 and FIG. 16 are two plan views of two sets of hexagonal elementary lenses 1a, 1b, et seq. and of the elementary images 2a, 2b, et seq. associated therewith;

FIG. 17 is an elevation view of a set of elementary lenses 1 associated with prisms 8 and with elementary images situated in a plane 3;

FIG. 18 is an elevation view of a screen 5 of the invention that is concave in shape;

FIG. 19 is an elevation view of a screen 5 of the invention that is convex in shape; and FIG. 20 is a perspective view of a camera including a screen of the invention.

The term "pixel" is used to designate a point of an image, which point is characterized solely by its color and its brightness, an elementary image being made up of a set of pixels.

Figure 1:
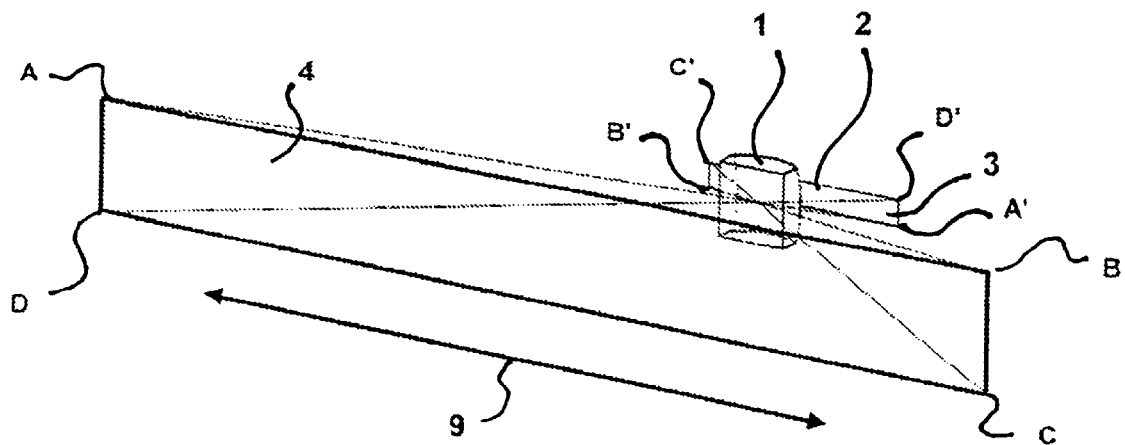

FIG. 1 is a perspective view of an elementary lens, an elementary image 2, and a viewing range 4 in which the eyes of a spectator can move along an axis 9.

The viewing range is a rectangle ABCD, for example because the spectator is a pedestrian moving along a sidewalk. The top of the rectangle corresponds to the heights of the eyes of the tallest spectators and the bottom of the rectangle to the heights of the eyes of the shortest spectators.

On the plane 3 situated behind the lens, at a distance therefrom that the person skilled in the art knows how to calculate, the set of points that the eyes of spectators can see clearly is also a rectangle A'B'C'D'.

This rectangle is broader than it is tall since the rectangle ABCD of which it is a projection is also broader than it is tall, given that the difference in height between spectators is smaller than the path length over which it is desirable for them to be able to view the screen.

Thus, the shape of the elementary image 2 is not identical to the projection of said elementary lens 1 onto the plane 3, but on the contrary its height is less than the projection of said elementary lens 4 onto the plane 3 while its width is greater than the projection of said elementary lens 1 onto the plane 3, thereby causing a portion of the elementary image to be situated in register with a portion of an elementary lens juxtaposed to the elementary lens 1 under consideration.

The greater the desired path length along the axis 9, the more it is necessary for the rectangle A'B'C'D' which is the envelope of the elementary image 2 to be stretched width-wise. However, the size of the lenses must be as small as possible so that the resolution of the screen is as good as possible (where screen resolution is the number of pixels per unit area). As seen by the spectator, each lens constitutes a pixel of the image viewed when the spectator is in a given location, and resolution is therefore better when the lenses are as small as possible.

One of the objects of the invention is to make it possible to use elementary images which are of great width even though the lenses remain small in size, and particularly elementary images that are wider than the lenses.

By reducing the focal length of the lenses, it would also be possible to reduce the width of the elementary images, however, at equal resolution for the elementary image, the number of pixels juxtaposed in the elementary image would be smaller. One of the objectives is, on the contrary, to have as large a number as possible of juxtaposed pixels in each elementary image, so that the spectator can see a large number of different images when moving along the axis 9. This large number of images visible depending on the position of the spectator has the advantage of enabling the images perceived by the spectator when moving along the axis 9 to be animated as in the cinema, and also of making it possible to provide images in relief if two images visible from two points that are slightly shifted along a horizontal axis correspond to two views of the same scene, one corresponding to the view for one eye and the other to the view for the other eye.

The fact of the images being wider than the lenses prevents the elementary lenses and the elementary images being juxtaposed on the same horizontal axis, since if that was done the elementary images associated with two juxtaposed lenses would overlap.

Figure 2:
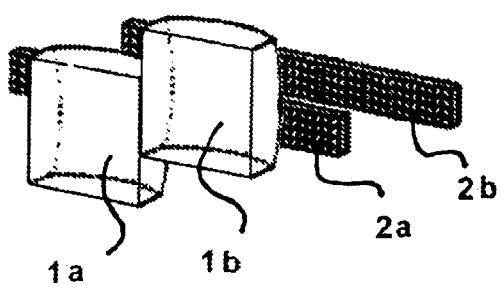

FIG. 2 shows how each elementary image 2 can be shifted upwards from its immediate neighbor, with each elementary lens 1 also be shifted relative to its immediate neighbor.

To clarify the explanation, the terms height and width are used herein. It is important to observe that these words do not refer to a terrestrial frame of reference, and that above and below it must be understood that width is the dimension along the travel axis 9 of the spectator, and height is the dimension at right angles thereto, and situated in a plane parallel to the plane of the screen.

The elementary images 2a and 2b which are associated with the square elementary lenses 1a and 1b shown in FIG. 2 are as large as possible when their height is equal to the vertical offset between two adjacent lenses, and their area is equal to the area of the lenses.

In general, to enable the elementary images to be juxtaposed while using all of the available area, the rule that must be complied with for a spectator situated at an infinite distance from the screen is that each elementary image occupies a rectangle for which:

height ($h_0$) is equal to the square root of the surface area of an elementary lens divided by a freely chosen coefficient K:

$h_0 = s^{0.5}/K$ width ($l_0$) is equal to the square root of the surface area of an elementary lenses multiplied by said freely chosen coefficient K:

$l_0 = s^{0.5} \times K$

The term "surface area" (s) of an elementary lens is used above and below to mean the surface area (S) of the screen divided by the number (w) of elementary lenses making it up:

$s = S/W$

The best possible ratio K is when K is equal to the square root of the ratio between the width (L) and the height (H) of the rectangle constituted by projecting the spectator's viewing range 4 orthogonally onto the screen, with the viewing range being defined as the set of points in which the eyes can be situated of the spectators for whose attention the screen is placed:

$K = (H \times L)^{0.5}$

It is possible to use very large coefficients K in order to obtain a very large number of images visible by the spectator when moving along the screen. The limit is reached when the height of an elementary image is equal to the height of one pixel that is printable on the elementary image by the reproduction system used. If the reproduction means used is photography, then the pixels can be very small, while the performance of a computer printer is considerably less good.

When the elementary image has a height of several pixels, it is possible either to juxtapose identical pixels vertically in the elementary image, thereby increasing the depth of field of the device, with images continuing to be seen clearly by spectators even when they move towards or away from the optimum viewing distance of the screen as designed by the person skilled in the art. This also has the effect of reducing the effect of the parallax difference which exists when a spectator moves towards or away from the screen: on moving closer, the spectator sees through the lenses near the top of the screen portions of elementary images situated significantly higher than those seen when the spectator is further away; and symmetrically, through lenses near the bottom of the screen the spectator sees portions of elementary images situated significantly lower than those seen when the spectator is further away. If the elementary images are constituted by identical lines, then the images seen close up and far away will be identical, within certain limits that the person skilled in the art can easily calculate.

It is also possible to use different lines to make up the elementary images; under such circumstances, spectators see different images on moving in a plane parallel to the plane of the screen and perpendicularly to the displacement axis 9. For example, when the screen of the invention is placed on the wall of an elevator shaft, the displacement axis 9 is vertical relative to the earth and the lines of each elementary image 2 are also vertical relative to the earth. The two eyes of a passenger in the elevator see two different images. Under such circumstances, the impression of relief can be obtained by the difference between those two lines, while the animation is provided by the vertical displacement of the elevator.

Figure 3:
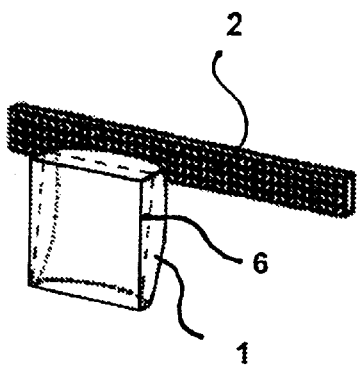

FIG. 3 shows a second embodiment of the invention. To make an elementary image 2 which is offset in height relative to said elementary lens 1 correspond with the spectator viewing range, a prism 6 may be associated with the lens 1. In equivalent manner, this can also be thought of as cutting out each elementary lens 1 without selecting the optical axis of the lens as the center of the square, in other words two horizontally juxtaposed elementary images 1a and 1b whose projections onto the plane of the screen are in horizontal alignment have their optical axes offset vertically from the height of an elementary image 2. The advantage of this second embodiment is that the screen is made up of horizontal lines of lenses which provides two advantages:

the elementary images can be made up of points lying on the same line of a "primary" image, it being specified that the term "primary image" is used below for an image that should be seen by the spectator when in a position that is fixed relative to the screen, and this makes it easier to build up elementary images from primary images produced by computer, since the images produced by computer are generally made up of rows and columns; and horizontal lines, which appear frequently in advertising posters, in particular, are seen better.

Figure 4:
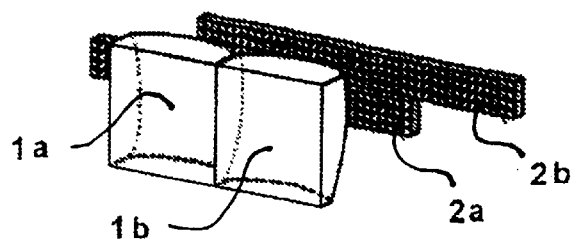

FIG. 4 shows two lenses 1a and 1b juxtaposed in this second embodiment of the invention.

Figure 5:
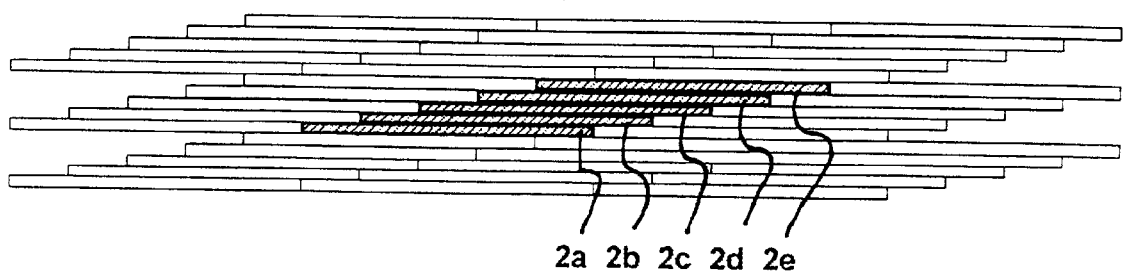
FIG. 5 is a plan view of a set of elementary images 2a to 2e associated with the set of elementary lenses 1a to 1e of FIG. 6.
Figure 6:
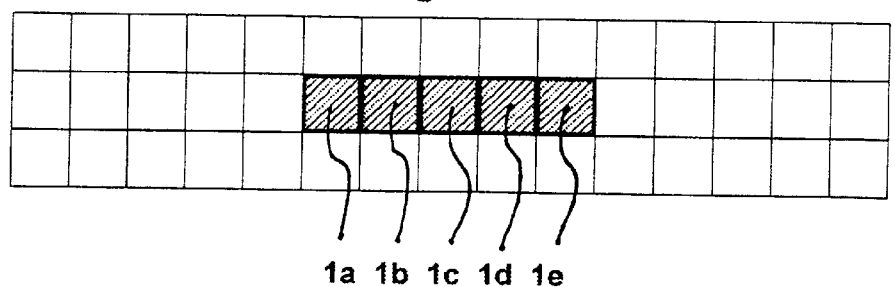
FIG. 6 is a plan view of a set of square elementary lenses 1a to 1e in said second embodiment and associated with the set of elementary images 2a to 2e of FIG. 5.

FIGS. 5 and 6 show how rectangular elementary images 2a, 2b, 2c, 2d, and 2e (FIG. 5) are associated with square lenses 1a, 1b, 1c, 1d, and 1e (FIG. 6) in said second embodiment of the invention.

Figure 7:
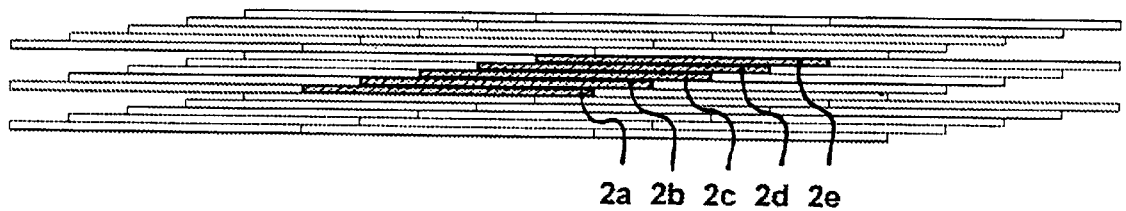
FIG. 7 is a plan view of a set of elementary images 2a to 2e associated with the set of elementary lenses 1a to 1e of FIG. 8.
Figure 8:
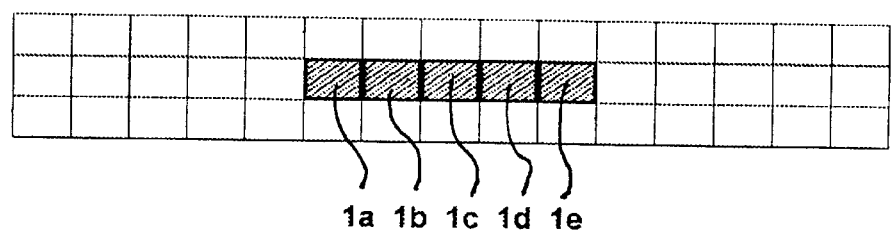
FIG. 8 is a plan view of a set of rectangular elementary lenses 1a to 1e in said second embodiment, associated with the set of elementary images 2a to 2e of FIG. 7.

FIG. 7 and FIG. 8 show how rectangular elementary images 2a, 2b, 2c, 2d, and 2e (FIG. 7) are associated with rectangular lenses 1a, 1b, 1c, 1d, and 1e (FIG. 8) in said second embodiment of the invention.

Figure 9:
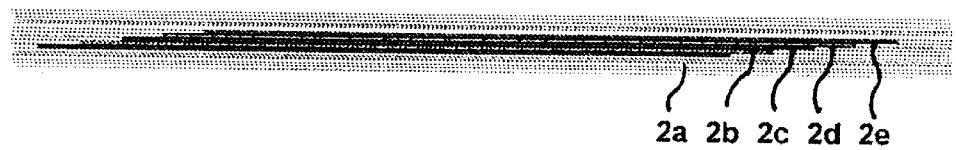
FIG. 9 is a plan view of a set of elementary images 2a to 2e associated with the set of square elementary lenses 1a to 1e assembled together along a sloping axis of FIG. 10.
Figure 10:
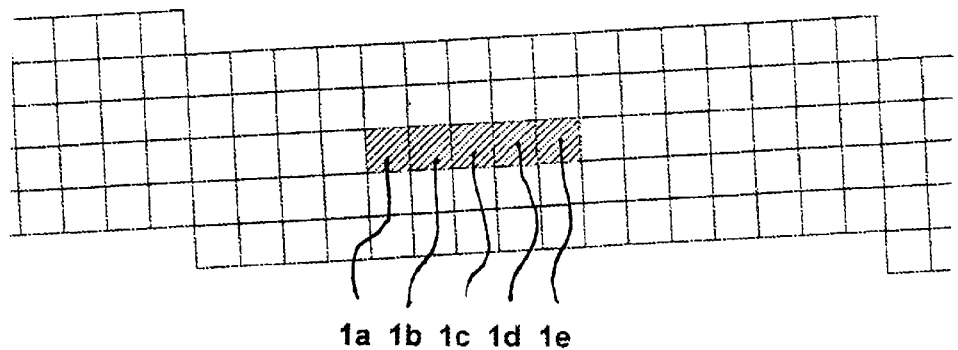
FIG. 10 is a plan view of a set of square elementary lenses 1a to 1e assembled in a checkerboard configuration that slopes relative to the horizontal, and associated with the set of elementary images 2a to 2e of FIG. 9.

FIG. 9 and FIG. 10 return to the first embodiment of the invention in which the elementary lenses do not have prisms and are centered optical devices with their optical axes in their centers, and these figures show how rectangular elementary images 2a, 2b, 2c, 2d, and 2e (FIG. 8) are associated with square lenses 1a, 1b, 1c, 1d, and 1e (FIG. 9). To obtain a vertical offset from one lens to its neighbor, the square elementary lenses in this case are disposed in a checkerboard configuration whose sides are neither parallel nor orthogonal to the displacement axis 9 or to the edges of the elementary images.

FIGS. 11 and 12 show two ways of manufacturing screens using such lenses. In both cases, the lenses are obtained by molding plates of transparent material and each plate has a large number of elementary lenses.

In FIG. 11, the faces of the elementary lenses on the same side as the spectator are plane and together they constitute the face of the screen closest to the spectator. This has the advantage of making it easier to control reflections on said face which can receive natural lighting, and also facilitates cleaning. The plate of elementary lenses has studs 11a, 11b, and 11c co-operating with slots formed in the medium 3 on which the elementary images are printed so as to ensure that the elementary lenses are properly located physically relative to said medium 3.

In FIG. 12, the elementary lenses 1a, 1b, 1c, et seq. are constituted by a centered optical system 5 whose face remote from its spectator side is plane, and made of a transparent plate 12 having a refractive index that is different from that of the lens. This disposition provides better optical characteristics since the rays that are the closest to being parallel are those situated on the spectator side. The plane faces of all of the lenses lie in a plane referred to as the "unique" plane, which is identical for all of the elementary lenses, and the transparent plate 12 is stuck to said plane. The elementary images are printed directly on the plane 3 of the back face of said transparent plate 12. This assembly of two transparent materials may be rigid but is preferably flexible so as to be able to take up various shapes and/or to be printed in numerous commercially available printers. This embodiment is particularly advantageous when it is desired to use lenses of very small dimensions, for example each lens being inscribed in a circle having a diameter of 0.5 mm to 2 mm, and for which it is desirable to have a very short focal length.

In another embodiment (not shown) the elementary lenses may naturally be Fresnel lenses. The advantage is then the compact nature of the assembly.

FIGS. 13, 14, 15, and 16 show various shapes of elementary lenses 1 and of polygonal elementary images 2 associated therewith. The three preferred types of polygon are triangles, rectangles, and hexagons, which may be regular or otherwise. The most advantageous polygon is the regular hexagon since it provides the highest ratio between working surface area for the lens and distance between the optical axis and the point of the lens that is furthest from said axis, and thus the best optical performance, in particular concerning the depth of field of the device. This disposition is also the disposition which makes it possible to place the largest number of lenses per unit area of screen.

Since the elementary lenses touch one another, which means that each of the six sides of an elementary lens coincides with a side of another lens, a preferred solution consists in inclining a row of elementary lenses 1 relative to the spectator displacement axis 9 by an angle of 0.333 radians and using a coefficient K equal to 2.77. Each elementary image 2 thus has large surface area.

This disposition has been successfully tested using hexagonal lenses each having an area of about 140 mm$^2$, and thus elementary images having a height of 32.8 mm and a width of 4.27 mm. The 31 mm focal length of the lenses make a pixel on the screen effectively viewable all along the travel of a spectator along the spectator displacement axis 9 over a total displacement representing an angle of 0.97 radians between the straight line going from the lens to the position of the spectator starting out and the straight line going from the lens to the position of the spectator reaching the end.

FIG. 14 corresponds to the embodiment of FIG. 10 and offers the advantage that a single set of lenses can be used to make screens which, depending on the elementary images used, can be disposed in a horizontal format (landscape) or in a vertical format (portrait).

FIG. 17 shows a particular embodiment of the invention making it possible to implement screens which are not situated in a plane perpendicular to light rays going to spectators. This problem can be solved by placing a prism 8 in front of each elementary lens so as to deflect light rays towards the spectators.

This angle correction can also be used to solve the problems associated with the parallax difference which exists between the top and the bottom of a screen of large dimensions. Under such circumstances it is necessary to place prisms near the top of the screen to deflect light rays downwards and, symmetrically, near the bottom of the screen prisms to deflect light rays upwards. An inverse correction can be obtained by placing prisms near the top of the screen to deflect light rays upwards, and symmetrically prisms near the bottom of the screen to deflect light rays downwards, for example if spectators turn out to be further away than expected when designing the set of elementary images.

To solve these parallax problems, it is also possible, as shown in FIGS. 18 and 19, to curve the screens 5 either to make them concave in the vertical direction (for observers situated closer than expected), or to make them convex in the vertical direction (for observers situated further away).

Nevertheless, the best method of correcting parallax difference consists in enlarging the image made up of the set of elementary images.

This enlargement is a function of:

the distance (F) between the focal plane of the elementary lenses 1 and the plane 3 containing the elementary images; and of the distance (D) between the spectator and said plane 3 containing the elementary images.

Optimum height and width (h, l) are calculated using the following formulae:

$$h = h_0 \times (D/(D-F))$$

$$l = l_0 \times (D/(D-F))$$

which, using the values given above for ($h_0$) and for ($l_0$):

$$h = (S/w)^{0.5} \times [D/(D-F)]/K$$

$$l = (S/w)^{0.5} \times [D/(D-F)] \times K$$

and expressing K as a function of the width L and the height H of the viewing range 4:

$$h = (S/w)^{0.5} \times [D/(D-F)]/(H \times L)^{0.5}$$

$$l = (S/w)^{0.5} \times [D/(D-F)] \times (H \times L)^{0.5}$$

Another way of correcting parallax difference, which can be used together with those described above consists in placing between the set of elementary lenses 1 and the spectator a single converging or diverging lens covering the entire surface area of the screen (not shown). Ideally, the single lens is a Fresnel lens.

Said diverging single lens has the effects of:

reducing the apparent area of each elementary lens, and thus increasing the apparent resolution of the screen;

reducing the effect on parallax error of varying the distance between the spectator and the screen; and making the subject seen by the spectator appear further away.

Said single converging lens has the effects of:

increasing the apparent area of each elementary lens, and thus decreasing the apparent resolution of the screen;

increasing the effect on parallax error of varying the distance between the spectator and the screen; and making the image viewed by the spectator appear to be closer to the spectator.

The elementary images can be obtained by calculation as described below.

For screens of small dimensions, when all of the lenses are viewed simultaneously by the spectator while moving along the screen, each elementary image comprises, from one side edge to the other, and in order:

a) a set C(x,y)P(n) of points copied from a subset, of abscissa x and of ordinate y, of the primary image of rank n;

b) a set C(x,y)P(n+1) of points copied from a subset, of abscissa x and of ordinate y, of the primary image of rank n+1; and c) so on, the abscissa x and the ordinate y of the elementary image being respectively equal to the abscissa x and the ordinate of the sets C.

The term "rank" of an image is used above and below to designate the chronological order in which the primary image is to be viewed by the spectator travelling along the screen.

For screens that are very wide, where only a fraction of the lenses can be seen simultaneously by the spectator while moving along the screen, it is possible to envisage making a sequence having a very large number of images that appear in succession while the spectator is moving. Under such circumstances, each elementary images comprises, from one side edge to the other, and in order:

a) a set C(x,y)P(n) of points copied from a subset, of abscissa x and of ordinate y, of the primary image of rank n;

b) a set C(x−1,y)P(n+1) of points copied from a subset, of abscissa x−1 and of ordinate y, of the primary image of rank n+1; and c) so on, the ordinate y of the elementary image being equal to the ordinate of the sets C.

In this case also, the term "rank" of a primary image is used to mean the chronological order in which said primary image is to be seen by the spectator when moving along the screen.

This rule can be applied equally well by taking into consideration only a portion of each primary image in order to change its frame.

It is also possible to decrease or to increase the number of different pixels belonging to a given elementary image line:

a pixel may be repeated a certain number of times in order to reduce the rate at which images follow one another for a spectator moving along the screen, or in order to reduce the impression of relief seen by the spectator;

on the contrary a certain number of pixels may be omitted, so as to increase the rate at which images follow one another for a spectator moving along the screen, or so as to increase the impression of relief visible by the spectator.

To obtain a sequence of images for playing back to a spectator by a screen of the invention, numerous methods can be used, including creating images by computer. One of the preferred methods consists in said primary images serving to make the elementary images being created by a motion picture camera which, while filming, is travelling along a path whose axis is substantially different from a line parallel to the axis of the camera lens, e.g. perpendicular thereto. In this way, two successive images of the same scene are taken from different points of view and the spectator sees a view in relief. In addition, if the scene changes during filming, these changes are reproduced when the spectator moves along the screen, giving a cinematographic impression. The effect of combining two measurement axes in this way, i.e. lateral displacement and time, gives rise to numerous anomalies. For example, an object moving in the travel direction of the camera will appear further away than it is while an object moving in the opposite direction will appear closer. The person skilled in the art can make use of such anomalies to achieve special effects.

It should be observed that displacement of the spectator in one direction along the screen enables the spectator to see the successive images of the film in one direction, while the spectator stopping enables the spectator to see a still based on one primary image, and moving in the opposite direction will cause the images of the film to be run in the opposite direction. Screens of the invention are particularly useful, for example to athletes seeking to study their movements image by image, or to engineers seeking to analyze a movement that is fast or complex.

It is also possible to make such images with a camera that is fixed and a scene that is moving. One of the most practical means (not shown) consists in placing the object or the person to be filmed on a turntable rotating about a vertical axis.

The performance of office computers is sufficient to compute elementary images quickly from a series of "primary" images whether computer-generated or obtained by a motion or a still camera (advantageously a camera of the digital type).

It is also possible to make the elementary images directly without any computation by using a special camera as shown in FIG. 20.

The photographic film is fixed directly to the back of the screen that is to be used for viewing it later on. The screen occupies the position normally occupied by a conventional film at the back of the camera which comprises:

a) a conventional camera lens 13 mounted in a horizontal slideway 15; and b) a shutter enabling the lens to be opened on multiple successive occasions.

For each successive picture, the lens is moved along the horizontal slideway. Elementary image portions corresponding to a particular viewpoint are then projected simultaneously when the shutter is opened.

In a preferred solution, the photographic film is merely constituted by the chemical compounds deposited directly on the back face of the screen of the invention, and the compounds are of the instant development type (e.g. as produced under the trademark Polaroid).

It is also possible to replace the photographic film situated on the back face of the screen of the invention as an image acquisition device by a set of photoelectric sensors of the kind used for television cameras.

Throughout this description:

each elementary lens 1 has been described as being a lens, however the person skilled in the art can replace this element by any other type of lens system having similar functions;

the screen has been described as being plane, and the set of elementary images 2 as being assembled in a plane parallel to the plane of the screen. The person skilled in the art can make screens of any shape, e.g. spheres, cylinders, or arbitrary shapes, providing the optical characteristics of each elementary device are designed accordingly; and the elementary images 2 are described as being fixed relative to the elementary lenses 1, however it can be advantageous, on the contrary, to organize horizontal displacement of the elementary images 2 relative to the set of elementary lenses 1, without said elementary images 2 changing plane. This movement, for which the optimum amplitude is equal to the width (l) of an elementary image, enables the spectator to see all of the images produced by the screen of the invention without the spectator needing to move.

The elementary images can be of any kind. For example, they may be:

images printed on a medium such as a sheet of paper or onto the lens plate proper;

electronic images (computer screen or TV screen); or images projected by a projector onto the rear face of the screen.

The main applications of the present invention are as follows:

advertising:

display panels providing spectators with hundreds or thousands of virtual displays in succession that differ depending on the position of each spectator, thereby enabling a single advertising space to be shared by different advertisers;

a panel providing a spectator with cinema type animation on moving through the optimum viewing zone (passageways for pedestrians, tunnels for cars, trains, and subways);

elevator shafts and the walls of escalators and moving walkways, etc.;

optionally illuminated signs at points of sale, which may be stationary of moving (e.g. rotary);

advertising panels on the sides of buses, taxis, trains;

making advertising objects and gadgets;

decoration:

points of sale (facades, shop windows, interior decoration), exhibition stands;

posters (virtual windows, virtual statutes, various images produced in series);

elements for decoration and DIY (bathroom and kitchen tiles, decorative patterns);

various objects (objects that are not plane: lamps, crockery, curios, etc.);

toys and games;

amusement parks:

new attractions giving spectators the illusion of moving in a virtual three-dimensional environment while being carried by a cart optionally giving the spectators physical sensations associated with changes in the forces applied to their bodies;

labyrinths;

education (explanatory pictures in three dimensions);

workstation terminals for computer-assisted design (architecture, industrial design offices);

medical imaging (3D x-rays, NMR, scanners, echography);

systems for analyzing motion (engineering, sports);

personal photography (making virtual statutes of people or objects);

aerial photography:

map making;

photographing houses and sites of interest;

post cards;

signalling:

road signs;

signs in offices and public buildings;

signal lights for cars, stickers placed on the backs of cars, enabling the following driver to estimate distance from the car.

What is claimed is:

1. A screen comprising a plurality of juxtaposed optical elementary devices, each of said optical elementary devices comprising an elementary lens and an elementary image situated in register with said elementary lens so that a spectator can see at least a portion of the elementary image through said elementary lens, the portion of the elementary image seen depending on the position of said spectator relative to the elementary lens, wherein each elementary image has a width greater and a height smaller than its corresponding elementary lens, said width and said height being measured in respective directions which are substantially parallel and substantially orthogonal to a direction of travel of the spectator, and elementary images corresponding to given elementary lenses that are adjacent in a direction parallel to the width of said elementary images are offset relative to each other in a direction parallel to the height of said elementary images.

2. A screen according to claim 1, characterized by the fact that said elementary image is inscribed in a rectangle of height (h) and width (l) defined by the following formulae:

$$h=(S/w)^{0.5} \times [D/(D-F)]/K$$

$$l=(S/w)^{0.5} \times [D/(D-F)] \times K$$

S being the total surface area of the set of elementary lenses when projected onto a plane parallel to the screen;

w being the total number of elementary lenses;

D being the distance between the eyes of the spectator and the plane containing the elementary images, F being the distance between the focal plane of the elementary lenses and the plane containing the elementary images; and K being an arbitrarily chosen coefficient greater than 1.

3. A screen according to claim 2, characterized by the fact that the elementary lenses are lenses in the form of regular hexagons, each lens touching another lens on all six sides, the rows of lenses being inclined at an angle of 0.33 radians relative to the direction of travel of the spectator in a plane parallel to the screen, and said coefficient K being equal to 2.77.

4. A screen according to claim 1, characterized by the fact that two elementary images corresponding to two given elementary lenses that are adjacent in a direction parallel to the width of said elementary images are offset relative to each other in a direction parallel to the height of said elementary images an amount height.

5. A screen according to claim 1, characterized by the fact that the ratio K is equal to the square root of the ratio that exists between the width and the height of the rectangle constituted by orthogonal projecting the geometrical locus of possible locations for the eyes of the spectator onto a plane parallel to the screen.

6. A screen according to claim 1, characterized by the fact that each elementary lens is constituted by a centered lenticular system and a prism.

7. A screen according to claim 6, characterized by the facts that the elementary lenses are arranged in rows parallel to the displacement axis of the spectator, and that the prism angle deflects light rays in such a manner that corresponding points of two elementary images are seen by the spectator through the two corresponding elementary lenses.

8. A screen according to claim 1, characterized by the fact that the elementary lenses are arranged in rows parallel to the width of the elementary images, and the optical axes of said elementary lenses are offset in said direction parallel to the height of the elementary lenses in such a manner that corresponding points of two elementary images are seen by the spectator through the two corresponding elementary lenses.

9. A screen according to claim 1, characterized by the fact that each elementary lens is provided with a prism system deflecting light rays towards spectators not situated in register with said elementary lens.

10. A screen according to claim 1, characterized by the fact that each elementary image comprises, from one side edge to the other, and in order:

a) a set C(x,y) P(n) of points copied from a subset, of abscissa x and of ordinate y, of the primary image of rank n;

b) additional sets of C(x,y)P(a) of points copied from a subset, of abscissa x and of ordinate y, of the primary image of additional ranks a; and the abscissa x and the ordinate y of the elementary image being respectively equal to the abscissa x and the ordinate y of the sects C, it being specified that the term "primary images" is the images that are to be shown in succession to a spectator moving along the screen, and that the term "rank" designates with respect to a primary image the chronological order in which said primary is to be seen by the spectator moving along the screen.

11. A screen according to claim 10, characterized by the fact that the "primary" images serving to make the elementary images are created by a motion picture camera which, while recording said primary images, describes a trajectory whose axis is substantially different from an axis parallel to the axis of the camera lens.

12. A screen according to claim 1, characterized by the fact that a stationary camera and the subject to be filmed is situated on a turntable.

13. A screen according to claim 1, characterized by the fact that the elementary lenses are Fresnel lenses.

14. A screen according to claim 1, characterized by the fact that the faces of the elementary lenses situated on the same side as the spectator are plane and together they constitute the face of the screen situated on the same side as the spectator.

15. A screen according to claim 1, characterized by the fact that the elementary lenses are molded plates of transparent material, each comprising a number of elementary lenses.

16. A screen according to claim 15, characterized by the facts that each elementary lens comprises a lens having a plane face situated on its side remote from the spectator, said face being situated in a unique plane which is identical for all of the elementary lenses, and that a transparent plate having different optical characteristics is stuck to the lenses, adhesion taking place in the said unique plane, and the elementary images being applied directly to a rear face of said transparent plate.

17. A screen according to claim 1, characterized by the fact that the screen includes an image acquisition device replacing the set of elementary images, and situated on a rear face of a camera, comprising:

a) a conventional photographic lens mounted on a horizontal slideway; and b) a shutter enabling the lens to make multiple successive exposures.

\* \* \* \* \*